No. 732,930. PATENTED JULY 7, 1903.
H. C. DÜNNEMANN.
ARGAND LAMP OR BURNER.
APPLICATION FILED FEB. 24, 1903.
NO MODEL. 7 SHEETS—SHEET 1.

Witnesses
C. E. Hunt
J. B. Willson

Inventor
H. C. Dünnemann
By H. B. Willson
Attorney

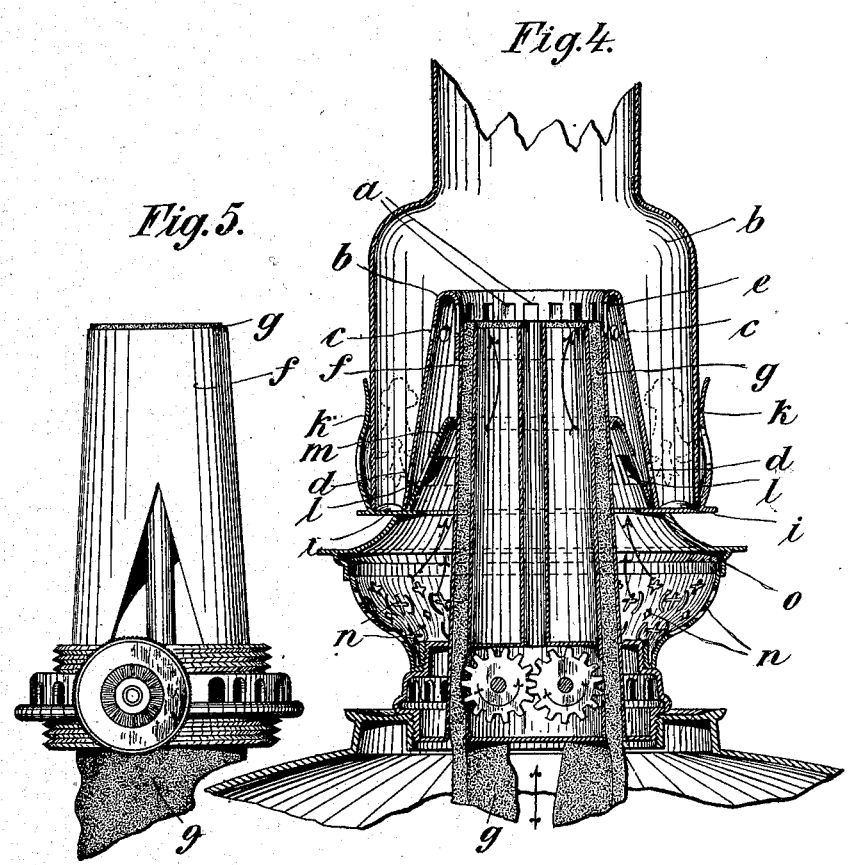

No. 732,930. PATENTED JULY 7, 1903.
H. C. DÜNNEMANN.
ARGAND LAMP OR BURNER.
APPLICATION FILED FEB. 24, 1903.
NO MODEL. 7 SHEETS—SHEET 3.
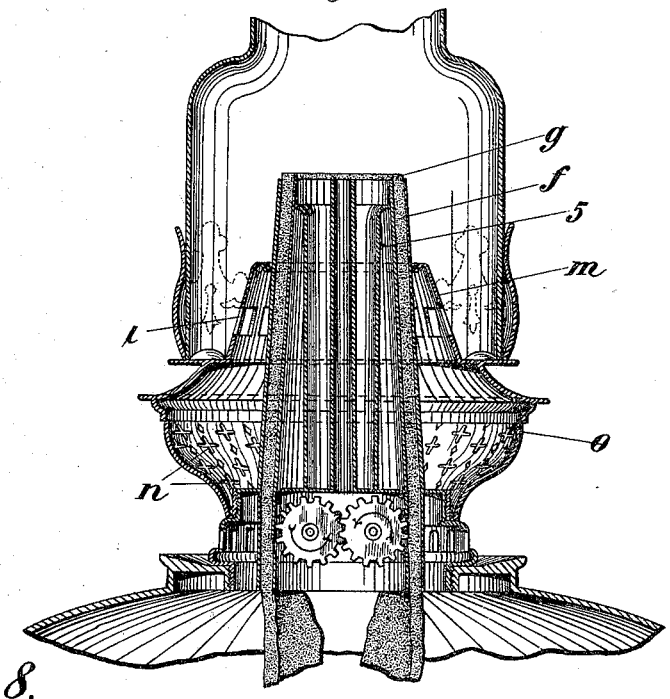
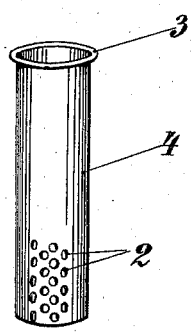
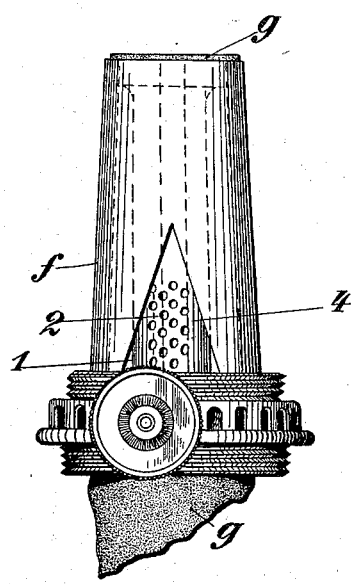
Witnesses
Inventor
H. C. Dünnemann,
By H. B. Wilson,
Attorney.

No. 732,930. PATENTED JULY 7, 1903.
H. C. DÜNNEMANN.
ARGAND LAMP OR BURNER.
APPLICATION FILED FEB. 24, 1903.
NO MODEL. 7 SHEETS—SHEET 4.
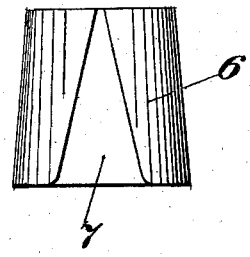
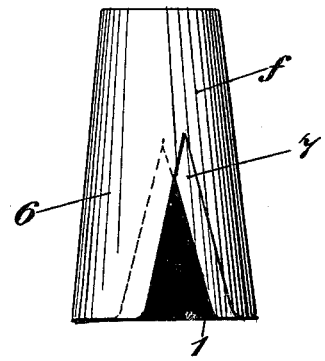
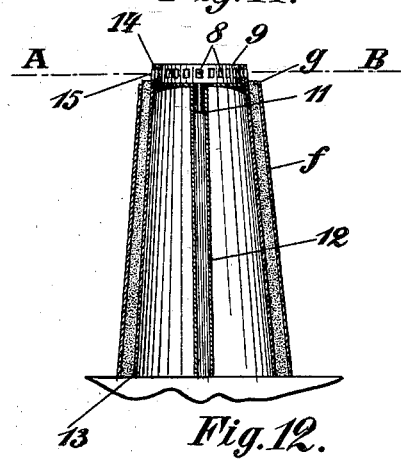
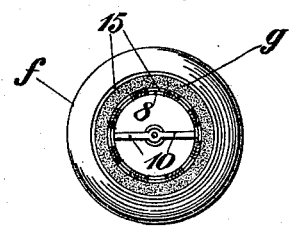
Witnesses
C. E. Hunt.
Roy C. Heflebower.
Inventor
H. C. Dünnemann
By H. B. Wilson
Attorney

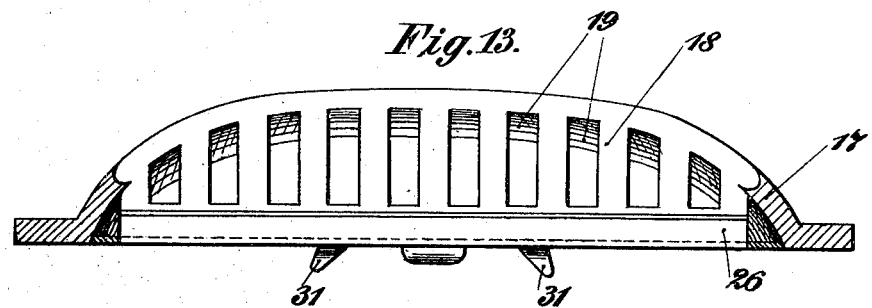
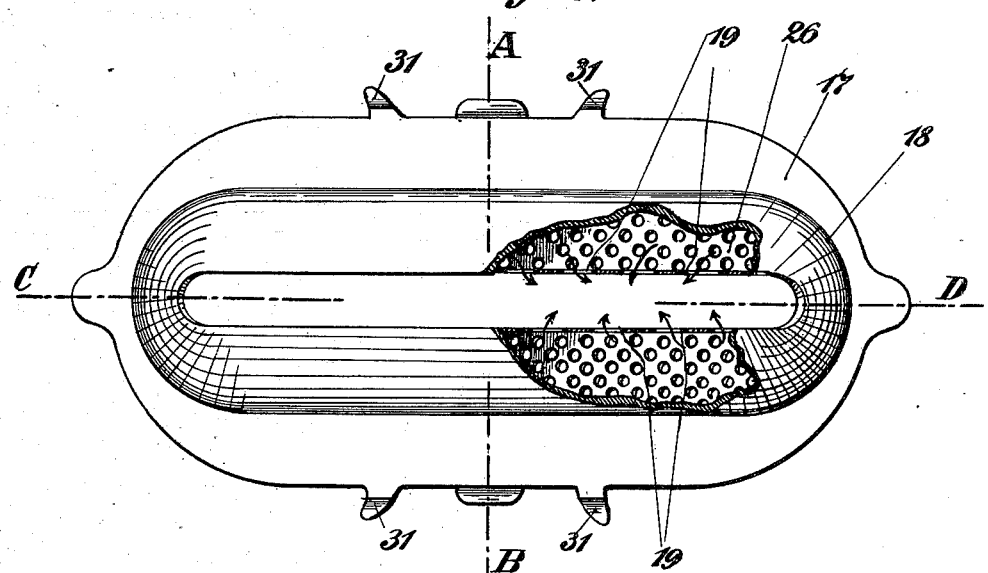
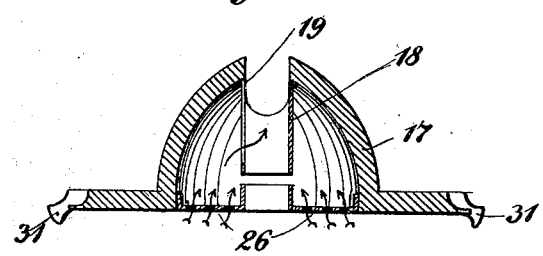

No. 732,930. PATENTED JULY 7, 1903.
H. C. DÜNNEMANN.
ARGAND LAMP OR BURNER.
APPLICATION FILED FEB. 24, 1903.
NO MODEL. 7 SHEETS—SHEET 6.
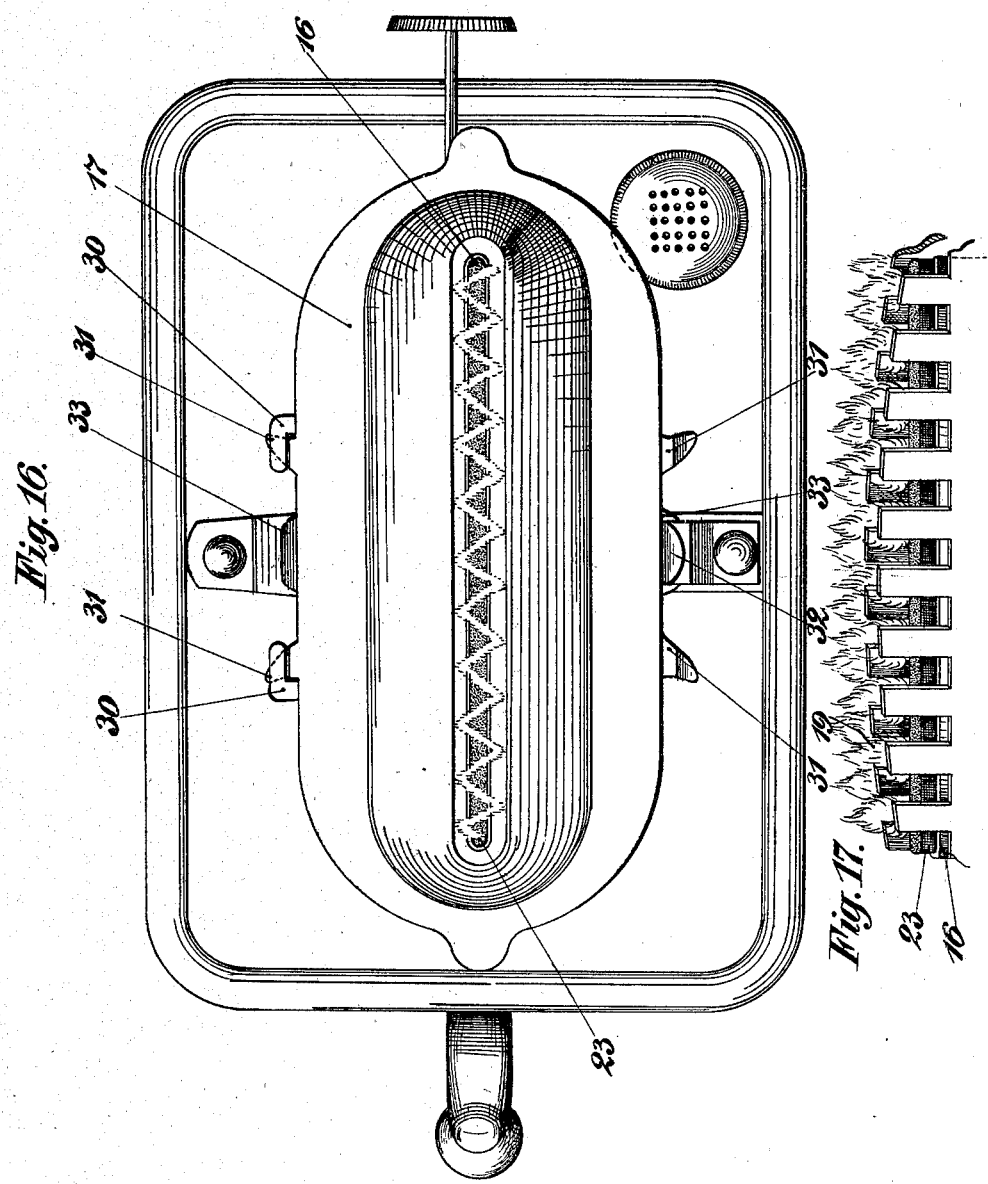
Witnesses
Inventor
H. C. Dünnemann No. 732,930. PATENTED JULY 7, 1903.
H. C. DÜNNEMANN.
ARGAND LAMP OR BURNER.
APPLICATION FILED FEB. 24, 1903.
NO MODEL. 7 SHEETS—SHEET 7.

No. 732,930. Patented July 7, 1903.

UNITED STATES PATENT OFFICE.

HEINRICH CHRISTIAN DÜNNEMANN, OF BREMEN, GERMANY.

ARGAND LAMP OR BURNER.

SPECIFICATION forming part of Letters Patent No. 732,930, dated July 7, 1903.

Application filed February 24, 1903. Serial No. 144,791. (No model.)

*To all whom it may concern:*

Be it known that I, HEINRICH CHRISTIAN DÜNNEMANN, merchant, a subject of the Emperor of Germany, residing at Schw. Meer 42, in the free town of Bremen, in the Empire of Germany, have invented certain new and useful Improvements in Argand Lamps or Burners, of which the following is a full, clear, and exact description.

This invention has reference to Argand lamps or burners, and has for its object and effect the combination of two separate parts, each of which is known—namely, of a perforated cap joining onto the top of the outer wick-tube, through the apertures in which air is conducted against the upper edge of the wick and strong evaporation of the combustible matter takes place, and also of a conical air-heater and air-supplier for burners.

In the annexed drawings my invention is shown applied to circular and flat burners.

Figure 1:
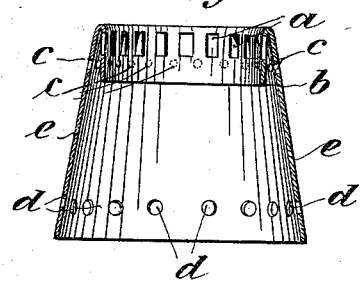
Figure 2:
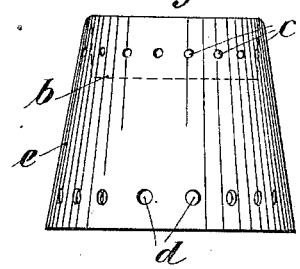
Figure 3:
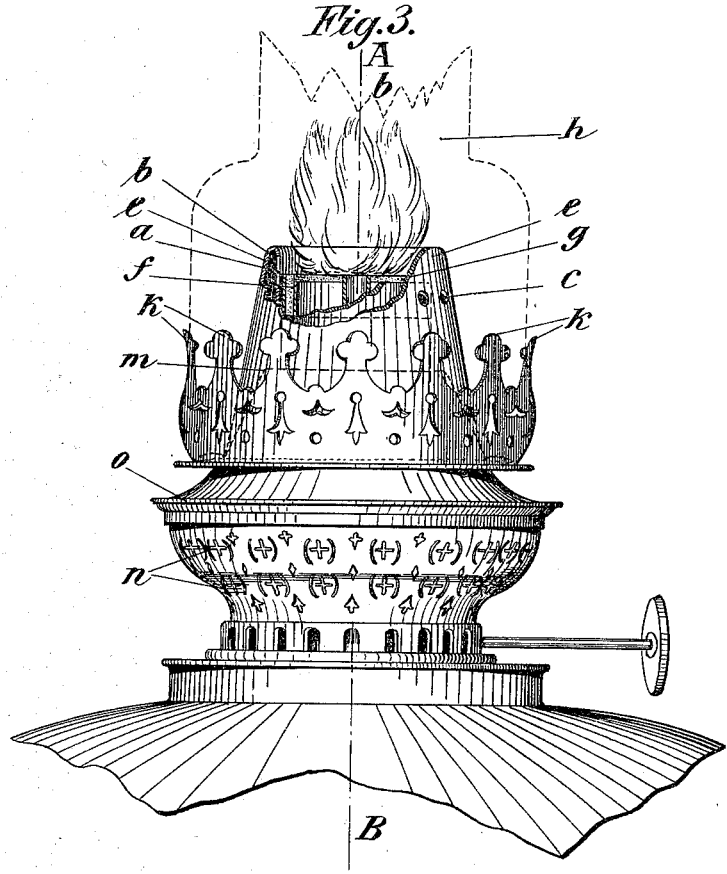
Figure 18:
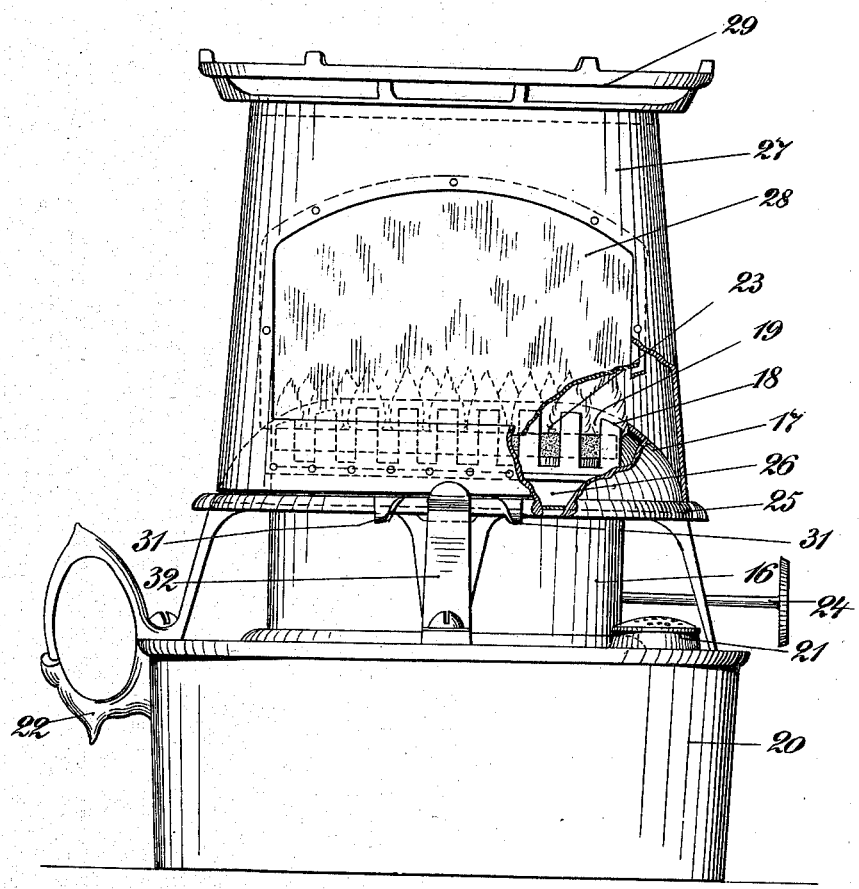

Referring to the drawings, Figure 1 shows the vertical section of a burner-cap according to my invention. Fig. 2 is an outside elevation of same. Fig. 3 is an elevation, partly in section, of a lamp with a circular burner and provided with the burner-cap. Fig. 4 is a central vertical section at line A B, Fig. 3, viewed in the direction of the arrow. Fig. 5 is an outside elevation of the wick-tube. Fig. 6 is a vertical section at line A B of Fig. 3 viewed in the direction of the arrow, but without the burner-cap. Fig. 7 is a perspective view of a tubular air-regulator. Fig. 8 is a front elevation of the wick-tube, showing the tubular regulator applied. Fig. 9 is a front elevation of a modified form of regulator, and Fig. 10 is a front elevation of the wick-tube with said regulator placed around it. Fig. 11 is a vertical section of the wick-tube, showing another form of regulator. Fig. 12 is a horizontal section of the same, taken at lines A B, Fig. 11. Fig. 13 is a longitudinal vertical section of a burner-cap for flat burners, taken at line C D, Fig. 15. Fig. 14 is a transverse vertical section taken at the line A B, Fig. 15. Fig. 15 is a plan viewed from above the burner-cap for flat burners shown in Figs. 13 and 14. Fig. 16 is a plan of a flat-burner appliance for lighting, heating, and cooking purposes and provided with a burner-ring according to my invention. Fig. 17 is a perspective view of the wick-tube surrounded by the perforated rim of the ring for flat burners. Fig 18 is a front elevation of the view shown in Figs. 16 and 17.

*Invention applied to round burners*, Figs. 1 to 12.—Referring to the drawings, the burner-cap mainly consists of a ring $b$, provided with apertures $a$. This ring is disposed at the upper inner part of a conical mantle $e$, tapering upwardly and being provided with lower and upper perforations $c\,d$, so taking the place of the burner-cap as customarily fitted to this class of lamps or burners.

The burner-cap formed as described is attached to the lamp in such a manner that, Figs. 3 and 4, the perforations of the evaporation-ring $b$ are on a level with the upper free end of the wick-tube $f$ and the upper end of the wick $g$ protruding from the tube, so that between the evaporator-ring $b$ and the wick-tube $f$ there is an interstice of about one millimeter.

The securing of the burner-cap in the position described within the cylinder $h$ of the lamp is effected by means of bracket-like projections $i$, on which the cylinder $h$, held in position by the gallery-clips, rests in such a manner as to admit air.

By means of the truncated cone $m$, tapering upwardly and provided with air-apertures $l$, the lower edge of the mantle of the burner-cap is prevented from being displaced laterally.

The mode of action of the burner is as follows: The air for supporting combustion, which enters when the lamp is lighted, is drawn in in the well-known manner below the burner, is heated to a certain extent between the wick-tube $f$ and the truncated cone $e$ by reason of the air, which on account of the suction is rapidly driven upward, striking against that part of the burner-cap which is formed by the upper tapering part of the air-regulator $e$ and the upper part of the evaporator $b$ within same. As a consequence the warmed air, which, moreover, is deflected by the act of striking, is driven through the apertures $a$ of the evaporator-ring $b$ in an injector-like manner in a radial direction from all sides against the flame, while at the same time the evaporator-ring $b$, which is heated by the radiant heat of the flame in close proximity with it, evaporates those portions of the volatile material (petroleum-oil or the like) which are exposed to the action of the evaporation-ring $b$ in the wick $g$, protruding from the wick-tube $f$, inside the ring $b$.

The advantages which are obtained by means of the employment of the burner-caps above described are, as has been ascertained by practical tests, as follows: The light is considerably improved, while at the same time there is a saving in the consumption of the oil. The burner does not necessitate the employment of any particular kind of petroleum-oil. In short, the heavier kinds of oil, which in the case of ordinary burners emit a poor light, cause smell, and smoke, will in ordinary burners provided with the burner-caps according to this invention burn with an exceedingly bright flame without the defects referred to. Moreover, when using the cap the burner is less sensitive to variations in the lamp-cylinders—that is to say, it is practically immaterial whether cylinders having a long foot or a short foot or a narrow or a wide waist are used. Even half-length cylinders do not affect the light to any appreciable extent. Moreover, the burner produces a light similar to incandescent gas-light and equivalent in color to an electric incandescent. When the wick $g$, which can be raised or lowered in the wick-tube $f$, has been lighted, the ambient air is driven or drawn to the flame through the apertures $n$ in the gallery part $o$. A portion of air so brought into the interior of the lamp will partly rise to the truncated cone $m$, and thence proceed through the apertures $l$, while another portion will pass through the triangular aperture 1, Fig. 8, of the wick-tube $f$ and in the interior of the latter rise to the flame. In order to regulate this latter current of air to the interior of the wick-tube $f$, a small tube 4, Figs. 7 and 8, provided with perforations 2 and the upper supporting-flange 3, is inserted in the latter.

As it is desirable that the tubular regulator 2 3 4 should be placed in position as securely as possible inside of the wick-tube $f$, there may be provided in the latter, if not already in existence in the lamp, an annular inner wall 5, which should be capable of being exchanged. Now accordingly as the perforations 2 of the tubular regulator 4 are more or less nearly opposite the triangular air-aperture 1 in the wick-tube $f$ more or less air will rise to the flame inside the wick-tube $f$. The desired regulation of the air therefore is attained by simply turning the tube 2 3 4 around its geometrical vertical axis in order to bring the perforations 2 more or less nearly opposite the air-admitter 1 of the wick-tube $f$, this being effected in any known suitable way.

The modified internal air-regulator (shown in Figs. 9 and 10) consists of a conical sleeve 6, the triangular segment 7 of which corresponds to the triangular air-inlet 1 of the wick-tube $f$. Now accordingly as the sleeve 6, placed around the lower part of the wick-tube $f$, more or less completely covers the triangular air-inlet 1 of the wick-tube $f$ the less or the more air will rise to the flame inside the wick-tube $f$, whereby the desired internal air regulation may be attained.

The modification represented in Figs. 11 and 12 shows an annular air-regulator, which mainly consists of a ring 9, provided with apertures 8. In order to secure this regulator in position upon the wick-tube $f$, the ring 9 is provided with a cross-bar formed by arms 10, to which is connected the hollow hub 11, the latter fitting into or on the inner tube 12 of the wick-tube $f$. The hollow hub 11 may of course be slit in the customary manner, so that it may hold securely in the inner wick-tube 12. The inner face or wall 13 of the wick-tube $f$ is provided with an extension 14, which is provided with apertures 15. Accordingly as the apertures 8 of the annular regulator more or less completely cover the apertures 15 of the wick-tube $f$ more or less air will be conducted to the flame, as will be readily understood.

*Invention as applied to flat burners*, Figs. 13 to 18.—The conical burner-cap 17, reaching up above the wick-tube 16, is provided with a rim 18, which is bent inward and almost vertically downward and lying against the outer wick-tube, and in that rim apertures 19 are arranged. As will be seen, more especially from the plan Fig. 15, the apertures are not exactly opposite to each other, but are displaced toward each other. The current of air entering through the apertures 19 will strike against the part of the wall of the rim 18 opposite to it, which serves as an evaporator, and be reflected by same again.

The receptacle 20 for holding the combustible matter is provided with a screw-stoppered filling-hole 21 and is also provided with a handle, while at the wick-tube 16 there is disposed a turning-key 24 for raising and lowering the wick 23. The foot-frame 25, connected with the receptacle 20 or consisting of one piece with same, serves for supporting a perforated sheet 26, through which the current of air drawn in when the wick 23 is alight enters the burner-cap 17 and chimney 27, provided with a watching-hole 28, covered with mica or the like and upon which a grid-plate 29 may be placed or inserted for the purpose of holding cooking utensils or the like.

For the purpose of securing the burner-cap 17 18 19 on the foot-frame 25 rigid hooks 30 are disposed on the latter for the projections 31 on the burner-cap and also a spring-hook 33 for the corresponding flap 33 on the burner-cap.

In order to use the burner-cap 17 18 19, which is renewable, on both sides, it may be provided with four flaps 31 and two flaps 33, as shown in Fig. 15.

What I claim, and desire to secure by Letters Patent, is—

1. The improvements in Argand lamps or burners comprising a cap reaching up beyond the wick-tube, and having a perforated rim bent inward, and almost vertically downward, said rim having apertures at about the height of the upper edge of the wick, whereby warmed air is driven in a radial direction, on to the vapors of the combustible matter, formed at the upper edge of the wick; for the purposes described.

2. Improvements in Argand burners, comprising a burner-cap $e$ reaching up beyond the wick-tube $f$, and having a rim $b$ bent inward, and almost vertically downward, said rim being provided with apertures $a$ on a level with the upper edge of the wick, and an internal air-regulating appliance, adapted for connection with or on the wick-tube $f$, whereby the current of air rising within the wick-tube $f$ may be regulated; substantially as described.

3. Improvements in Argand burners, comprising a burner-cap $e$ reaching up beyond the wick-tube $f$, and having a rim $b$ bent inward and almost vertically downward and in which rim-apertures $a$ are provided on a level with the upper edge of the wick, and an internal regulating device, a tube 4 having perforations 2, and mounted for rotation in the wick-tube $f$ and governing the air-inlets therein; substantially as described.

4. Improvements in Argand burners, comprising a burner-cap $e$, reaching up beyond the wick-tube $f$, provided with an internal air-regulating appliance and having a rim $b$ bent inward and almost vertically downward, and in which rim-apertures $a$ are provided on a level with the upper edge of the wick; with a conical sleeve 6 provided with a segment 7, and rotatable around the wick-tube and governing the air-inlets therein; substantially as described.

5. Improvements in Argand burners, comprising a burner-cap $e$ reaching up beyond the wick-tube $f$, provided with an internal air-regulating appliance, and having a rim $b$ bent inward, and almost vertically downward, and in which rim-apertures $a$ are provided on a level with the upper edge of the wick; a ring 9, 10, 11, provided with apertures 8 and rotatable on or in the upper part of the wick-tube $f$, opposite to the apertures 15 in same.

In witness whereof I subscribe my signature in presence of two witnesses.

HEINRICH CHRISTIAN DÜNNEMANN.

Witnesses:
F. A. BRYCE,
FR. HOYERMANN.